(12) United States Patent
Goldstein et al.

(10) Patent No.: US 7,346,587 B2
(45) Date of Patent: Mar. 18, 2008

(54) INTELLIGENT METHOD OF ORDER COMPLETION IN AN E-COMMERCE ENVIRONMENT BASED ON AVAILABILITY OF STORED BILLING INFORMATION

(75) Inventors: Seth Goldstein, San Francisco, CA (US); Rajesh Mahajan, Fremont, CA (US); Prakash Muppirala, San Jose, CA (US); Benjamin L. Quigley, Burlingame, CA (US); Jai Rawat, Sunnyvale, CA (US); Venkatesh Subramanya, Fremont, CA (US); Vincent Tran, Los Gatos, CA (US)

(73) Assignee: AOL LLC, Dulles, VA (US)

( * ) Notice: Subject to any disclaimer, the term of this patent is extended or adjusted under 35 U.S.C. 154(b) by 176 days.

(21) Appl. No.: 10/313,748

(22) Filed: Dec. 6, 2002

(65) Prior Publication Data

US 2004/0111374 A1    Jun. 10, 2004

(51) Int. Cl.
*G06Q 99/00* (2006.01)
(52) U.S. Cl. ............... 705/67; 705/65; 705/77; 705/79; 705/41
(58) Field of Classification Search ......... 235/380; 705/50–79, 39–44
See application file for complete search history.

(56) References Cited

U.S. PATENT DOCUMENTS

| | | | |
|---|---|---|---|
| 5,221,838 A | 6/1993 | Gutman et al. | 235/379 |
| RE34,915 E | 4/1995 | Nichtberger et al. | 364/401 |
| 5,500,890 A | 3/1996 | Rogge et al. | 379/91 |
| 5,687,322 A | 11/1997 | Deaton et al. | 395/214 |
| 5,764,890 A * | 6/1998 | Glasser et al. | 713/202 |
| 5,862,223 A * | 1/1999 | Walker et al. | 705/50 |
| 5,897,622 A | 4/1999 | Blinn et al. | 705/26 |
| 5,903,652 A * | 5/1999 | Mital | 705/78 |

(Continued)

FOREIGN PATENT DOCUMENTS

EP    640 945    3/1995

(Continued)

OTHER PUBLICATIONS

YAHOO!Wallet. Dec. 2001. Retrieved online. The Wayback Machine. http://web.archive.org/web/20011216023617/help.yahoo.com/help/wallet/index.html.*

(Continued)

*Primary Examiner*—Jalatee Worjloh
(74) *Attorney, Agent, or Firm*—Michael A. Glenn; Glenn Patent Group

(57) ABSTRACT

An intelligent method of e-commerce order completion automatically completes an order using either stored billing information, or information supplied at purchase if none is stored. User sends an order to a merchant. On receipt, user's authentication level is checked. If user is authenticated and billing information has been stored, it is retrieved and order completed without further user action. When none has been stored, flow redirects to a digital form for entering billing information, whereupon order is completed. In this case, after order completion, the user may save billing information to create a new digital wallet. To create the wallet, if the user isn't authenticated, or is insufficiently authenticated, they are first prompted to authenticate. Upon wallet creation, the user is fully authenticated and can complete purchases quickly without providing billing information with every purchase.

6 Claims, 2 Drawing Sheets

U.S. PATENT DOCUMENTS

| | | | | |
|---|---|---|---|---|
| 5,999,914 | A | 12/1999 | Blinn et al. | 705/26 |
| 6,070,150 | A | 5/2000 | Remington et al. | 705/34 |
| 6,116,505 | A | 9/2000 | Withrow | 235/381 |
| 6,208,264 | B1 | 3/2001 | Bradney et al. | 340/825.31 |
| 6,327,578 | B1* | 12/2001 | Linehan | 705/65 |
| 6,381,582 | B1 | 4/2002 | Walker et al. | 705/26 |
| 6,601,761 | B1* | 8/2003 | Katis | 235/379 |
| 7,024,390 | B1* | 4/2006 | Mori et al. | 705/41 |
| 2002/0095386 | A1* | 7/2002 | Maritzen et al. | 705/64 |
| 2005/0187883 | A1* | 8/2005 | Bishop et al. | 705/67 |
| 2006/0106681 | A1* | 5/2006 | Shafron et al. | 705/26 |

FOREIGN PATENT DOCUMENTS

| | | |
|---|---|---|
| EP | 940 760 | 9/1999 |
| EP | 564 469 | 1/2000 |
| EP | 1 132 839 | 9/2001 |
| EP | 1 139 262 | 10/2001 |
| EP | 1 139 263 | 10/2001 |

OTHER PUBLICATIONS

Electronic Wallet. Wells-Fargo 2002. Retrieved from IDS.*

*Net Passport Overview;* Mar. 20, 2002; http://ww.microsoft.com/myservices/passport/overview.asp.

*Microsoft Passport;* C.E. Rider; E-Business Strategies & Solutions; Dec. 1999.

*Wells Fargo Electronic Wallet;* Wells Fargo Electronic Wallet Overview; 2002; heep://save.wellsfargostore.com/wallet/Default.asp?SID=.

*Yahoo Wallet and Express Checkout;* Yahoo Shopping; 2002.

*Suzannes.com Help;* Suzannes.com; http://www.suzannes.com/helpsection.html.

*Mondex;* J. Deign; Computer Bulletin; Dec. 1996.

*Untraceable Off-Line Cash in Wallet with Observers;* S. Brands; Proceedings of the Crypto; Aug. 22-26, 1993.

*Net Passport Home; One Easy Way to Sign In and Shop Online;* 1999-2022; http://www.pasport.com/Consumer/default.asp?Ic=1033.

*Wells Fargo Electronic Wallet:* Frequently Asked Questions; http://save.wellsfargostore.com/wallet/FAQ.asp?SID=.

*Yahoo? Shopping Consumer Reports Help;* Yahoo? Shopping; 2001; http://help.yahoo.com/help/us/shop/premium/pre,ium-12.html.

* cited by examiner

INTELLIGENT METHOD OF ORDER COMPLETION IN AN E-COMMERCE ENVIRONMENT BASED ON AVAILABILITY OF STORED BILLING INFORMATION

BACKGROUND OF THE INVENTION

1. Field of the Invention

The invention relates to the field of electronic commerce. More particularly, the invention relates to an intelligent method of order completion based on availability of stored billing information, such as a digital wallet.

2. Description of Related Art

It is becoming increasingly common for entities such as Internet service providers, online communities and portals to provide e-commerce networks to users and members wherein the entity provides centralized access to a large number of affiliated online merchants. Such e-commerce networks are advantageous to users, providing an enhanced online experience, and often allowing them to purchase goods and services at a significant discount. Affiliating with the e-commerce network provides the merchants with valuable marketing support, the user communities providing large pools of motivated, pre-qualified prospects. Finally, the e-commerce networks are beneficial to their sponsoring entities, allowing them to add value to their basic service and generating additional revenue streams.

Typically, such networks provide a single sign-on authentication. Frequently, they provide digital wallets, in which a user stores his or her billing information, such as billing address and credit card information. P. Hartmann, J. Bezos, S. Kaplan, J. Spiegel, Method and system for placing a purchase order via a communications network, U.S. Pat. No. 5,960,411 (Sep. 28, 1999) describe such a wallet wherein the user completes a purchase by performing a single action such as clicking a mouse after merchandise is selected.

Thereafter, when making purchases, billing information is automatically supplied from the wallet, eliminating the need for the user to enter billing information every time he or she makes a purchase from one of the affiliated merchants, a significant obstacle to purchasing, while greatly minimizing the possibility the user's billing information will be compromised in transit. Such networks of merchants often allow purchases by non-subscribers and those who don't have digital wallets, in which different levels of authentication may be encountered. It has been necessary to provide different methods of order completion for users of varying status. For example; one for users having a wallet who are fully authenticated, another for a user who lacks a wallet, another for a user of a third party wallet, and so on. Each method requires a separate user interface element, such as an 'Order' button, at the point of sale. The multiplicity of order buttons complicates the order completion process. Often, in confusion and frustration, the user may select the merchant's own order completion process that requires them to provide billing information they may already have provided in their digital wallet; or they may abandon the order altogether.

There exists, therefore, a need in the art for a means of simplifying the order completion process that encourages wallet usage. It would be a great advantage to provide an intelligent method of order completion that is capable of determining a user' authentication status and checking for the presence of previously stored billing information. It would be desirable to provide accelerated order completion without further interaction in the case of users who have previously stored billing information. It would be advantageous to automatically redirect transaction flow to a manual order completion process in the event that billing information is unavailable. Finally, it would be advantageous to provide single user interface element, such as an 'Order' button, to initiate the method.

SUMMARY OF THE INVENTION

The invention provides an intelligent method of order completion for e-commerce environments, in which the order is automatically completed using stored billing information, such as provided by a digital wallet, or from billing information supplied by the user at the time of purchase in the event that stored billing information is unavailable. The user, from a client, sends the order to the merchant, typically by way of an action such as clicking an 'Order' button. On receipt by the merchant, a query is directed to a server, wherein the user's authentication level is checked. If the user is authenticated/recognized and has previously stored billing information in a digital wallet, or in a subscriber record, the information is retrieved and the order is completed without further action from the user. If no billing information has been stored, or if the user is not authenticated/recognized, the flow is redirected to a digital form through which the user can enter their billing information, whereupon the order is completed. On the digital form, the unauthenticated user could also have a means of authenticating whereby any stored information that they might have could be used to complete the order and bypass this form. After order completion, the user (if unauthenticated or has no billing information in a digital wallet) may be given the option of saving their billing information to a new digital wallet. On accepting the option of saving their billing information to a new digital wallet, if the user is not authenticated, or if the authentication level is insufficient, the user is first prompted to authenticate before actually creating the digital wallet. After creating their new digital wallet, the user is fully authenticated and is able to complete purchases quickly and conveniently without having to provide billing information every time they wish to purchase.

DETAILED DESCRIPTION OF THE INVENTION

The invention provides an intelligent method of order completion for e-commerce environments that is based on availability of stored billing information. In the event that such stored billing information for a user exists, the order is completed without further action from the user if already authenticated at the desired level. If no such information is available, transaction flow is redirected to an order method wherein the user is requested to provide the information at the time of sale.

Figure 1:
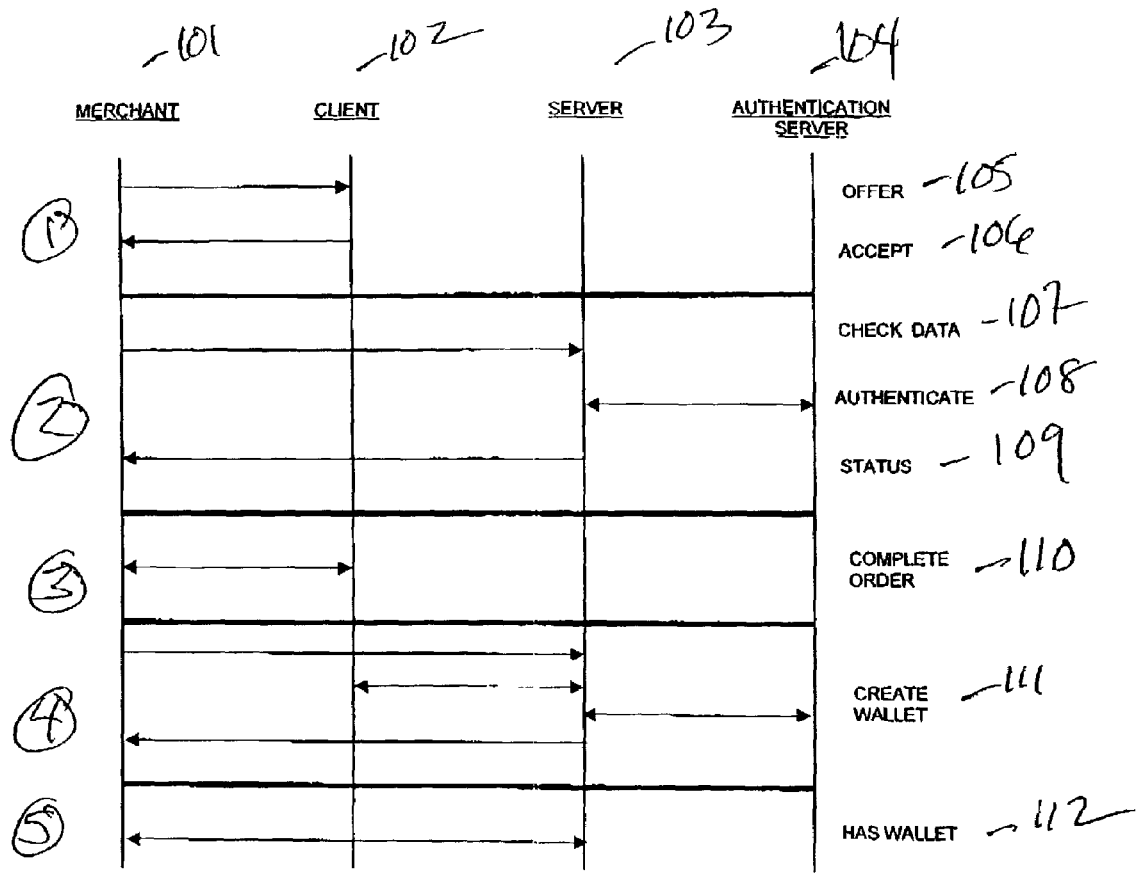
FIG. 1 provides an interaction diagram of an intelligent method of order completion in an e-commerce environment based on availability of stored billing information according to the invention.

Referring now to FIG. 1, shown is an interaction diagram of the invented method. The preferred embodiment of the invention may be implemented in e-commerce environments such as the networks of affiliated online merchants provided by online services and ISP's (Internet Service Provider) like AMERICA ONLINE™ (DULLES Va.).

Allowing purchases from users of varying status in this way requires a flexible method of order completion that is capable of determining a user's status, whether or not they are authenticated, their level of authentication, and whether or not they have stored billing information available, and proceeding accordingly.

At a high level, as shown in FIG. 1, the method involves several different logical stages:

1. The User Initiates an Order.

Typically, an online merchant 101 extends an offer 105. The offer may be made through a conventional e-commerce store from a merchant affiliated with an e-commerce network, an online service or an IMP. The user may have gained access to the merchant's store because they had been searching for a particular service or item of merchandise offered by the merchant, wherein the user selected a service or item for purchase by placing it in a digital shopping cart. Alternatively, the user may have responded on impulse to a pop up ad. During this logical stage, interaction is between the user, by way of a client 102, such as a web browser and the merchant 101. The initial stage of the method concludes with the user accepting the offer 106.

2. The Merchant Checks User Authentication and Availability of Billing Information.

After the merchant receives the order, a query is directed from the merchant 101 to a server 103, in order to check if billing information can be transparently obtained for the user 107. The singular term 'server' has been used for convenience of description. In fact, the server may include more than one server. For example, stored billing data may be stored in several forms, in one or more data files or data bases, on different servers.

Before checking billing information, it may be necessary to determine if the user is authenticated 108. As previously indicated, purchasers may be of different status. For example, the user may not be authenticated at all, as would be the case with a user who is not a service subscriber. Alternately, the user may be a subscriber, but their level of authentication for the current session is not sufficient for making purchases. Finally, the user may be fully authenticated. Thus a query is directed from the server 103 to an authentication server 104. The authentication server returns the result of the authentication query to the server 103.

Based on the results of the authentication query, the server 103 returns any of several status codes 109 to the merchant 101, for example:

Success. The user is sufficiently authenticated and has a wallet; the wallet data is returned;

Success. The user is sufficiently authenticated, does not have a wallet, but billing data is available from another source (e.g. a file of subscriber records);

User not authenticated, wallet status unknown;

User is recognized, and has billing data, but it not provided. This may be for several reasons: the user is not authenticated at a high enough level, or the merchant isn't authorized to automatically retrieve billing information; and User is recognized, but doesn't have billing information.

3. Order Completion.

After the server either returns billing data 103 or a status code to the merchant 101, as above, the order is completed 110 between the merchant and the client 102. When billing information is returned, order completion is automatic. The fields of the merchant's order form are populated with the billing data from the wallet or other source, and the order is executed. This step is completed seamlessly, without any further action from the user, in fact without the user's awareness. Optionally, at this stage, the merchant may confirm the information with the user.

When billing information is unavailable, the transaction is completed conventionally, with the user manually entering their billing data upon presentation by the merchant of an order completion page. If billing information wasn't provided simply because the user was unauthenticated or was insufficiently authenticated, the order presentation page may optionally include a link or a button that allows the user to authenticate. Upon authentication, the server 103 may provide billing information so that the transaction may proceed automatically, as previously described. More will be said below about the outcomes resulting from the various status messages. Stage 4, "Create wallet," and Stage 5, "Has wallet" only occur if the server failed to return billing data because the user didn't have a wallet. In the case of users who don't have wallets, when the order is completed, they may optionally be offered an opportunity to create a wallet.

4. Create Wallet.

After the transaction is complete, the user may be offered the opportunity to create a wallet 111. Wallet creation primarily involves interaction between the client 102, server 103, and the authentication server 104. For example, the authentication server 104 may need to create an account for the user, necessitating the user to supply authentication data such as a logon name and a password. After authentication, the authentication server 104 redirects to the server 103, whereupon the server 103 interacts with the client 102 to obtain the information necessary for creation of the wallet. Following wallet creation, flow returns to the merchant 101.

5. Has wallet.

At the completion of the 'Create wallet' stage, flow is returned to the merchant 101, with the user fully authenticated, and having billing data that is readily available for automatic order completion for future purchases.

Figure 2:
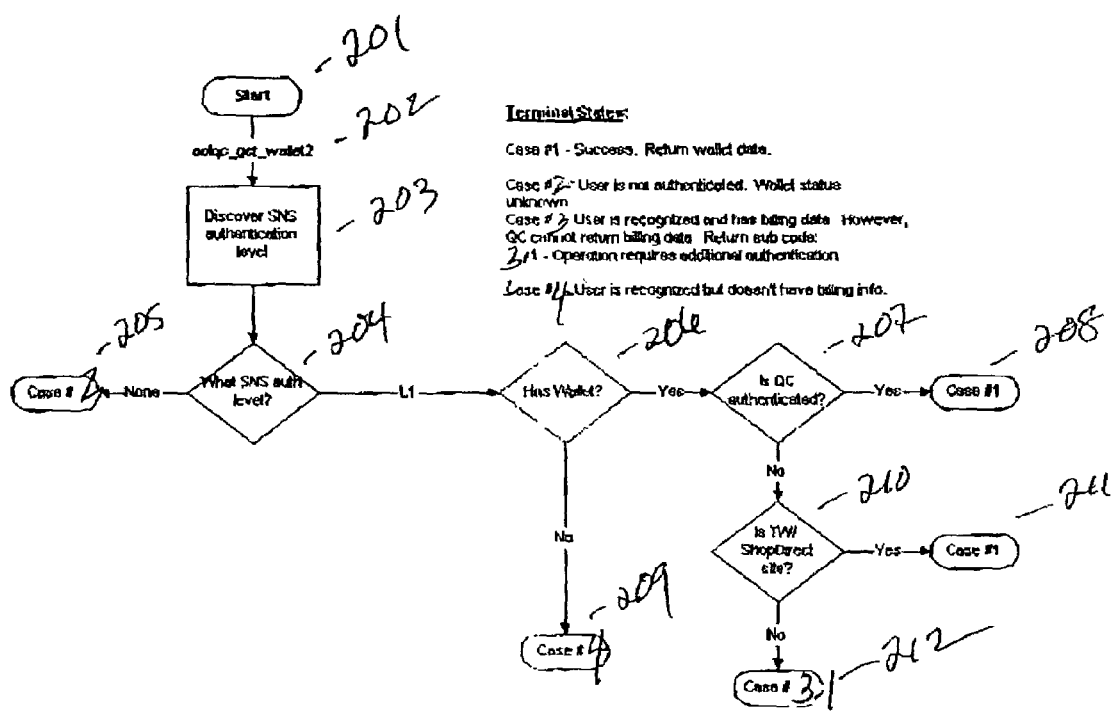
FIG. 2 provides a flow diagram of a logical stage from the method of FIG. 1 according to the invention.

FIG. 2 is a flow chart that provides a closer look at flow in stage 2, when the merchant checks user authentication and availability of billing information. FIG. 2 describes the behavior of an object-oriented method that transmits the merchant and transaction data to the server 102 to check user authentication and availability of stored billing data. 'Start' 201 is the point at which the method 202 is invoked, when the merchant directs a query to the server 103. First, it is determined if the user is authenticated 204. If the user is not authenticated, the method returns Case #2, "User is not authenticated. Wallet status unknown." If the user is authenticated, the method determines if the user has a wallet 206. Additionally, at decision block 206, the method could check for billing data from a subscriber record. If no billing data are available, the method returns Case #4, "User is recognized but doesn't have billing information" 209. If the user has a wallet, the method determines if the wallet is authenticated 207. If yes, then the method returns Case #1, "Success. Return wallet data" 208. If not, the method determines if the merchant is one from which a lower level of authentication is permissible 210. If yes, then the method returns Case #1 211. If not, the method returns Case #3.1,"

One skilled in the art will recognize that the transmission of sensitive data such as billing information over publicly-accessible networks dictates the provision of a means of securing the user's confidential data. While the preferred embodiment of the invention is implemented using the SSL protocol (Secure Sockets Layer), other forms of data encryption are suitable and are entirely consistent with the spirit and scope of the invention.

While the invention has been described herein in relation to the Internet, such description has been illustrative only, and is not meant to limit the invention. The invention generally finds application in any network environment employing client-server architecture. Furthermore, the invention also finds application in fields other than e-commerce, in the field of financial transactions, for example.

The invention is implemented using conventional methods of network engineering, particularly client-server networks. Conventional methods of computer programming are employed in creating the invention, particularly using object-oriented languages such as JAVA. However, other languages are suitable as well.

Although the invention has been described herein with reference to certain preferred embodiments, one skilled in the art will readily appreciate that other applications may be substituted for those set forth herein without departing from the spirit and scope of the present invention. Accordingly, the invention should only be limited by the claims included below.

The invention claimed is:

1. An intelligent method of order completion comprising the steps of:
   receiving an order originated by a user;
   determining authentication status of said user;
   checking for the availability of a digital wallet for said user;
   without said user's intervention, automatically obtaining billing information from an alternative source when a digital wallet for said user is unavailable, wherein said alternative source comprises any of:
      a subscriber record; and
      a record of previous purchase;
   creating a digital wallet using said billing information from said alternate source;
   completing said order without said user's intervention;
   wherein said step of completing said order comprises the steps of:
      populating fields of a digital order from with billing information without said user's action or awareness;
      executing said order; and
   when a digital wallet is available, completing said order based on billing information from said digital wallet without user intervention.

2. The method of claim 1, further comprising the step of:
   returning a status as "user not authenticated" when said authentication status does not permit wallet use.

3. The method of claim 1, wherein said step of creating a digital wallet comprises:
   creating a wallet with said billing information if said user agrees.

4. The method of claim 1, further comprising the steps of:
   when said authentication status does not permit wallet use and user has not previously created a wallet,
      asking said user to supply billing information for order completion; and
      creating a wallet with said billing information if said user agrees after successfully authenticating the user.

5. The method of claim 1, wherein completing said order comprises the steps of:
   when said authentication status does not permit wallet use and user has not previously created a wallet:
   redirecting flow to a digital form, wherein said user manually enters billing information; and
   executing said order.

6. A computer program product comprising computer readable ode embodied on a tangible medium, said computer readable code comprising code means for performing an intelligent method of order completion comprising the steps of:
   receiving an order originated by a user;
   determining authentication status of said user;
   checking for the availability of a digital wallet for said user;
   without said user's intervention, automatically obtaining billing information from an alternative source when a digital wallet for said user is unavailable, wherein said alternative source comprises any of:
      a subscriber record; and
      a record of previous purchase;
   creating a digital wallet using said billing information from said alternate source;
   completing said order without said user's intervention;
   wherein said step of completing said order comprises the steps of:
      populating fields of a digital order from with billing information without said user's action or awareness;
      executing said order; and
   when a digital wallet is available, completing said order based on billing information from said digital wallet without user intervention.

* * * * *